April 1, 1947.　　　J. W. McCONAGHY　　　2,418,185
SEALING DEVICE
Filed May 26, 1944
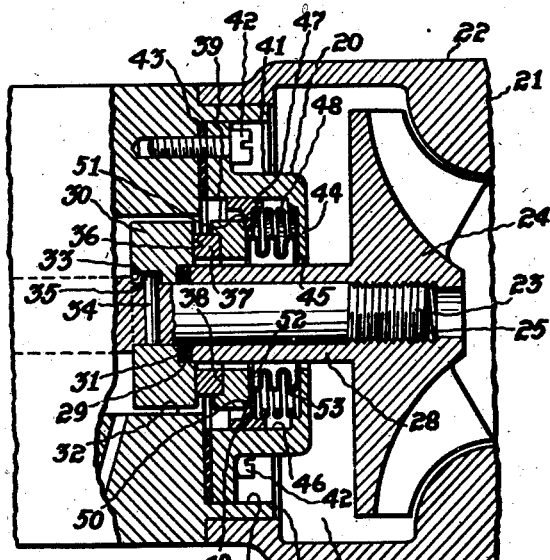
FIG.-1.
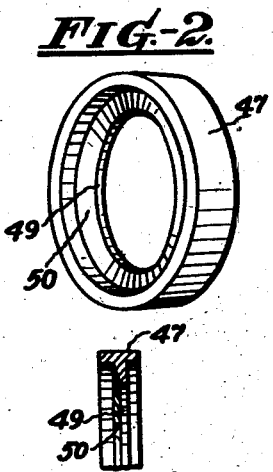
FIG.-2.
FIG.-3.
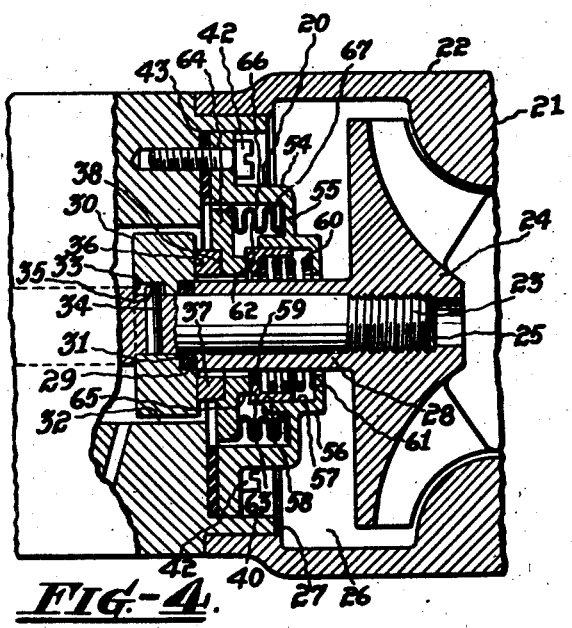
FIG.-4.
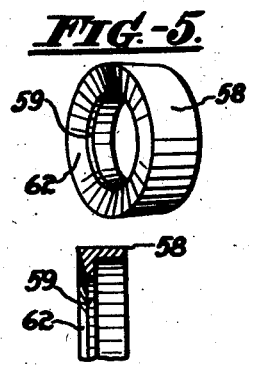
FIG.-5.
FIG.-6.
INVENTOR
James W. McConaghy
BY
HIS ATTORNEY.

Patented Apr. 1, 1947

2,418,185

UNITED STATES PATENT OFFICE 2,418,185

SEALING DEVICE

James W. McConaghy, Phillipsburg, N. J., assignor to Ingersoll-Rand Company, New York, N. Y., a corporation of New Jersey Application May 26, 1944, Serial No. 537,493

2 Claims. (Cl. 286—11)

This invention relates to a sealing device for a rotary member, as for example the shaft of a centrifugal pump.

More particularly the invention relates to that class of sealing device known as mechanical seals comprising rotary and non-rotary components having sealing surfaces that cooperate with each other to perform the sealing function. One of the members is capable of movement axially of the other member, and in this way a limited quantity of fluid is permitted to enter between the members for lubricating their cooperating surfaces.

One object of the invention is to assure the retention of the non-rotary, axially movable component in the correct sealing and operative relations with the rotary sealing component.

Another object is to prevent the occurrence of undue vibratory movement of the movable sealing member and the parts associated therewith.

Still another object is to assure axial alignment of the non-rotary sealing member with the rotary sealing member and to effect the speedy return of the non-rotary member to axial alignment with the rotary member in the event that the former is shifted radially out of its normal operative position.

Other objects will be in part obvious and in part pointed out hereinafter.

In the drawings accompanying this specification and in which similar reference numerals refer to similar parts, Figure 1 is a longitudinal elevation, partly in section, of a pump equipped with a sealing device constructed in accordance with the practice of the invention, Figure 2 is a perspective view of a detail, Figure 3 is an elevation, in section, of a fragmentary portion of such detail, Figure 4 is a view similar to Figure 1 showing a modified form of the invention, and Figures 5 and 6 are views similar to Figures 2 and 3, respectively.

Referring to the drawings and at first more particularly to Figures 1, 2 and 3, 20 designates the sealing device and 21 a pump embodying it.

The pump is shown as being of the centrifugal type and comprises a casing 22, a shaft 23 extending through the casing, and an impeller 24 mounted on the shaft and secured thereto by a threaded connection 25. The chamber 26 within the casing 22 containing the impeller may be provided with the usual inlet and outlet openings (not shown) and is, as will be readily understood, subjected to the discharge pressure of the fluid being pumped.

The impeller is spaced from the end wall 27 of the chamber 26 so that fluid may circulate freely therebetween. It carries, on its rearward end, an annular extension 28 that encircles the shaft 23 and extends part way into a recess 29 in the end surface of a collar 30 arranged on the shaft 23. A packing member 31 in the recess 29 prevents the leakage of fluid along the shaft 23 into the collar 30.

The collar 30 lies within a bore 32 in the casing 22 and seats against a shoulder 33 on the shaft 23. The collar is keyed to the shaft by a pin 34 an end of which extends into a slot 35 in the collar.

On the end of the collar 30 facing the chamber 26 is a sealing surface 36 that cooperates with an end of a sealing member 37 encircling the shaft 23. The sealing member 37 is the non-rotary component of the sealing device. It is seated in a recess 38 in an end surface of a holder 39 and may be secured thereto in any suitable manner. The holder 39 is preferably in the form of an annular plate, and the bores within said holder and the sealing member 37 are of larger diameter than the extension 28 which these parts encircle to permit the free flow of fluid through the holder and the sealing member to the sealing surface 36.

As a preferred arrangement the end wall 27 is provided with a recess 40 to receive the holder and the sealing member and also a cage 41 encircling these parts. The cage is secured to the bottom of the recess 40 by screws 42 and a sealing member 43 is clamped between the cage and the bottom of the recess 40.

The body of the cage 41 is of cylindrical shape and at its free end is a wall 44 having an aperture 45 to receive the extension 28. The aperture 45 is of larger diameter than the extension to afford communication between the interior of the cage and the chamber 26 so that the liquid may flow freely from the chamber 26 through the cage and the bores in the holder 39 and the sealing member 37 to the sealing surface 36.

The interior surface of the cage 41 is of cylindrical shape and constitutes a guiding surface 46 for a ring 47. The ring 47 is forced in the direction of the sealing member 37 by a spring 48 of the helical compression type that seats at one end against the wall 44 and at its other end against an internal flange 49 in the ring 47.

The ring 47 is slidable on the guiding surface 46, and on the side of the flange confronting the holder 39 is a coniform surface 50 that seats against a similar surface 51 at the marginal portion of the end surface 52 of the holder. The surfaces 50 and 51 are coaxial with the shaft 23 and with the active sealing portions of the member 37 and the collar 30. The sealing member 37 will, by reason of this arrangement and the pressure of the spring 48 against the ring 47, always tend to remain in the correct axial relationship with the surface 36 and will be quickly returned to such position whenever said member and its holder are caused to move laterally of the shaft by vibration incident to the operation of the pump.

In such case the surface 52 will ride radially over the coniform surface 50 and move the ring 47 away from the sealing surface 36, thereby increasing the compression of the spring which, by its reaction, will again move the ring 47 in the opposite direction and cause the sealing member to be shifted radially to its corect operative position.

From the foregoing description, it will be readily apparent that the ring not only serves to centralize the sealing member with respect to the sealing surface 36 but also to damp out vibration of the sealing member and its holder.

In order to obviate the necessity of effecting fluidtight fits between the surfaces 50 and 51 and between the ring 47 and the guiding surface 46 for preventing the flow of fluid directly from the interior of the cage 41 across these surfaces a sealing member 53, in the form of a corrugated, resilient sleeve commonly known as a Sylphon, is placed about the extension 28 in spaced relation thereto. The sleeve 53 is hermetically connected at one end to the holder 39 and at its other end to the inner surface of the wall 44 of the cage and, in addition to its sealing function, serves to convey liquid from the chamber 26 to the sealing surfaces of the collar 30 and the member 37.

In the form of the invention shown in Figures 4 to 6 inclusive, the cage, designated 54, is provided at its end wall 55 with a cylindrical portion 56 the interior surface of which constitutes a guiding surface 57 for a ring 58 that is slidable thereon.

The ring 58 has an internal flange 59, and a compression spring 60 within the ring acts against one end of said flange and at its other end against a wall 61 on the cylindrical portion 56 to urge the ring in the direction of the sealing surface 36. On the opposite side of the flange 59 is a coniform surface 62 for engagement with an annular seating surface 63 on a holder 64 for the sealing member 37.

The seating surface 63 is located on a boss 65 on the holder 64 and is defined by the peripheral surface and the end surface 66 of the boss.

In this form of the invention, the spring 60 and the ring 58 are exposed to the liquid flowing from the chamber 26 to the sealing surface 36, and they are encircled by a Sylphon 67 connected at one end to the holder 64 and at its other end to the inner surface of the end wall of the cage 54.

I claim:

1. In a sealing device, the combination of a casing having a chamber for fluid and a rotor having a sealing surface, a sealing member to cooperate with the sealing surface for controlling the leakage of fluid from the chamber, a holder for the sealing member having a cylindrical portion and an annular seating surface at the juncture of the peripheral surface and an end surface of said portion, a cage on the casing encircling the rotor having its interior in communication with the chamber and having a guiding surface, a ring slidable on the guiding surface having a coniform surface coaxial with the seating surface to seat thereagainst for retaining the sealing member in axial alignment with the sealing surface, a spring in the cage to press the coniform surface against the seating surface and to press the sealing member against the sealing surface, and an annular resilient sealing member hermetically connected to the holder and the cage to prevent the flow of fluid from the cage around the outer marginal portion of the holder.

2. In a sealing device, the combination of a casing having a chamber for fluid and a rotor having a sealing surface, a sealing member to cooperate with the sealing surface for controlling the leakage of fluid from the chamber, a holder for the sealing member having a cylindrical portion and an annular beveled seating surface at the juncture of the peripheral surface and an end surface of said portion, a cage on the casing encircling the rotor having its interior in communication with the chamber and having a guiding surface, a ring slidable on the guiding surface having a coniform surface coaxial with the seating surface to seat thereagainst for retaining the sealing member in axial alignment with the sealing surface, a spring in the cage to press the coniform surface against the seating surface and to press the sealing member against the sealing surface, and an annular resilient sealing member coaxial with the spring and the ring in spaced relation therewith and hermetically connected to the cage and the holder for preventing the flow of fluid from the cage around the marginal portion of the holder.

JAMES W. McCONAGHY.

REFERENCES CITED

The following references are of record in the file of this patent:

UNITED STATES PATENTS

| Number | Name | Date |
| --- | --- | --- |
| 2,015,515 | Evans | Sept. 24, 1935 |
| 2,347,118 | Matter | Apr. 18, 1944 |